Dec. 12, 1967     H. F. HUNGER     3,357,861
BARRIERS FOR FUEL CELLS
Filed May 6, 1963
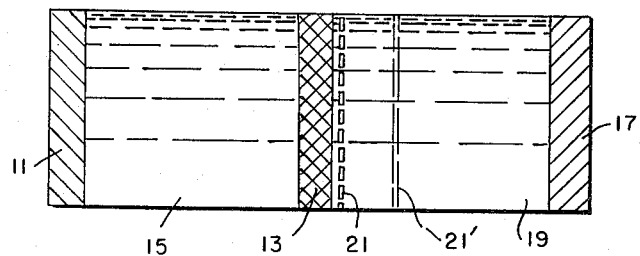
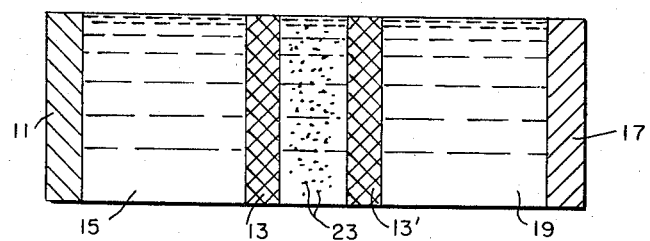
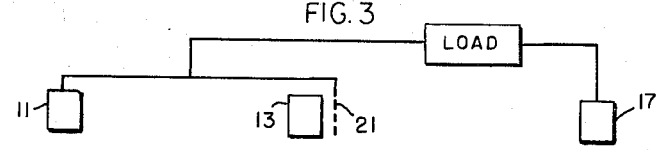
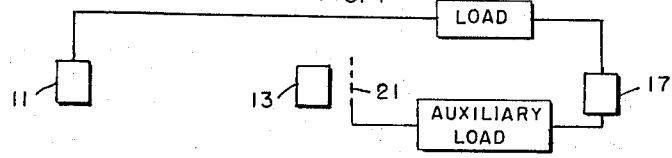
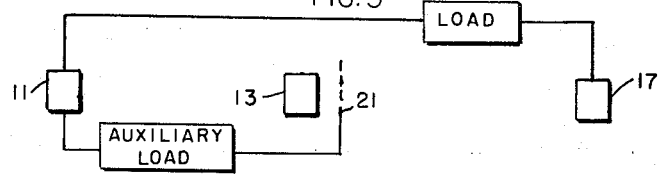
INVENTOR,
HERBERT F. HUNGER
BY *Harry M. Saragovitz*
ATTORNEY.

3,357,861
BARRIERS FOR FUEL CELLS
Herbert F. Hunger, Long Branch, N.J., assignor to the United States of America as represented by the Secretary of the Army
Filed May 6, 1963, Ser. No. 278,811
3 Claims. (Cl. 136—86)

The invention described herein may be manufactured and used by or for the Government for governmental purposes without the payment of any royalty thereon.

This invention relates to improvements in fuel cells in general, and in particular to improvements in fuel cells having a solvated ion exchange resin membrane as the electrolyte.

Fuel cells have been defined as electrochemical devices in which part of the energy derived from a chemical reaction, maintained by the continuous supply of chemical reactants, is converted to electrical energy. The fuel cells generally comprise a fuel electrode, an oxidant electrode, and an electrolyte separator between the two electrodes. The electrodes are generally in the form of hollow bodies, such as porous plates, and a gaseous oxidizing agent, such as oxygen, air or halogen is passed to the interior of the oxidant electrode, while a liquid or gaseous fuel is passed to the interior of the fuel electrode. The oxidizing gas and the fuel are adsorbed and de-adsorbed in the pores of the oxidant and fuel electrodes, respectively, leaving these electrodes in the form of ions with the electrode bodies remaining electrically charged. The ions may then recombine in the electrolyte.

In a particular type of fuel cell, the electrolyte in the form of a solvated ion exchange resin membrane is positioned between the two electrodes, and a gaseous fuel supplied to one of the electrodes and an oxidant to the other electrode. Both anion and cation exchange resins have been used for this purpose. The fuel cells having a solvated cation exchange resin membrane as the electrolyte give a higher efficiency than present energy conversion devices when the liquid fuel used is a mixture of an electrochemically oxidizable, electrolyte soluble organic compound as for example, methanol with an acid as, for example, sulfuric acid. The fuel cells having a solvated anion exchange resin membrane as the electrolyte give a higher efficiency than present energy conversion devices when the liquid fuel used is a mixture of an electrochemically oxidizable, electrolyte soluble organic compound as for example, methanol with either an inorganic hydroxide, an inorganic carbonate, or an inorganic bicarbonate.

In the above described fuel cells, one of the functions of the ion exchange resin membrane electrolyte is as a separator to slow down the diffusion rate of fuel or its oxidation products from the fuel electrode to the oxidant electrode and, also, to slow down the diffusion rate of oxidant or its reduction products from the oxidant electrode to the fuel electrode. The separator, although slowing down the diffusion rates, does not prevent with time, a gradual buildup of fuel or its oxidation products or oxidant or its reduction products at the counter electrode. This is also true in other fuel cells where a finely porous plastic sheet as for example, a porous Teflon sheet serves as the separator. The diffusion to the counter electrode disturbs the electrode reaction there due to depolarization effects or chemical side reactions at the electrode catalyst.

An object of this invention is to overcome the problem of the diffusion of fuel or its oxidation products or oxidant or its reduction products to the counter electrode in fuel cells having an electrolyte separator in the form of an ion exchange resin membrane positioned between the gas permeable electrodes.

It has now been found that the above objectives can be attained by including a diffusion barrier in the above described fuel cell. The barrier used can be a porous layer in the form of a porous plate, sieve, or film, consisting of, or including, catalysts which destroy the undesirable substance(s) fuel or/and oxidant by chemical action, for example, dehydrogenation, hydrogenation, molecular decomposition, oxidation, etc. The barrier can also consist of, or include, the above described catalysts dispersed in the electrolytic liquid itself.

In the instance where the barrier takes the form of a porous plate, sieve, or film, it is positioned between the ion exchange resin membrane electrolyte separator and the porous fuel electrode or between the ion exchange resin membrane electrolyte separator and the porous oxidant electrode. Specifically, if it is desired to overcome the problem of the diffusion of fuel or its oxidation products to the counter electrode or porous oxidant electrode, then the diffusion barrier will be positioned between the separator and the porous oxidant electrode. The barrier may be in contact with the separator as for example, in the form of a deposited film, but the barrier cannot be in contact with the electrode or a short circuit will occur. If it is desired to overcome the problem of the diffusion of oxidant or its reduction products to the counter electrode or porous fuel electrode, then the barrier will be positioned between the separator and the porous fuel electrode. Here again, the barrier may be in contact with the separator but not in contact with the electrode. If it is desired to overcome the problem of the diffusion of fuel or its oxidation products or oxidant or its reduction products to the counter electrode at the same time, then an anti-fuel diffusion barrier will be placed between the separator and the porous oxidant electrode, and an anti-oxidant diffusion barrier will be placed between the separator and the porous fuel electrode. Either, or both, of the barriers in the latter case may be in contact with the separator, but neither barrier may be in contact with the electrode.

Where the diffusion barrier consists of, or includes, catalysts dispersed in the electrolytic liquid itself, then the diffusion barrier can be contained between two ion exchange membrane electrolyte separators; the separators in turn, being spaced from the porous fuel electrode and porous oxidant electrode respectively, by electrolytic liquid. The catalyst used in the dispersion can be of the anti-fuel diffusion type, or the anti-oxidant diffusion type, or a combination of an anti-fuel diffusion type and an anti-oxidant diffusion type.

The amount of either anti-fuel diffusion catalyst or anti-oxidant diffusion catalyst in the above described diffusion barriers must be sufficient to prevent the exceeding of the tolerance level of the counter electrode. The tolerance level may be defined as the amount of fuel or oxidant in the electrolyte under which the counter electrode is not inhibited in its operation.

In the instance where an acid electrolyte is used in the fuel cell, the catalysts of the barrier could be noble metals as platinum, or mixtures of noble metals with base metals as platinum-silver, platinum-iron, etc. In the instance where an alkaline electrolyte is used in the fuel cell, the catalysts of the barrier could be activated nickel, platinum, etc., with support or without support. In the instance where oxygen is the oxidant for the fuel cell, it is desired to prevent hydrogen peroxide, the reduction intermediate, from diffusing to the porous fuel electrode of the fuel cell. In such a case, the catalyst of the barrier can be finely divided silver or finely divided silver on carbon powder where the electrolyte is alkaline, or finely divided platinum or finely divided platinum on carbon where the electrolyte is acid. Radio-isotopes as $Sr^{90}$ and $Co^{60}$ could also be used as the catalyst of the barrier to prevent the diffusion of hydrogen peroxide to the porous fuel electrode of the fuel cell.

The invention can be best understood by referring to the accompanying drawing in which:

FIG. 1 is a schematic view of a fuel cell according to the invention in which a barrier is placed between the separator and the porous oxidant electrode;

FIG. 2 is a schematic view of a fuel cell according to the invention in which another type of barrier is included; and FIGS. 3, 4, and 5 illustrate electrical connections that can be made with the fuel cell shown in FIG. 1 to provide for additional electrical energy output of the cell.

Referring to FIG. 1, a porous fuel electrode 11 of 3 to 30 mils in thickness is spaced from a separator 13 of 3 to 60 mils in thickness in a solution 15 of a fuel, as for example, methanol in sulfuric acid electrolyte. The contained area of the solution 15 is 0 to 50 mils in thickness. A porous oxidant electrode 17 of 10 to 60 mils in thickness is spaced from separator 13 in a sulfuric acid electrolyte 19 of 0 to 50 mils in thickness. The separator 13 hinders free convection between the solution of methanol in sulfuric acid 15 and the sulfuric acid electrolyte 19 and also limits diffusion of methanol into the sulfuric acid electrolyte 19 and to the porous oxidant electrode 17. The separator 13 cannot, however, completely prevent the diffusion. Small amounts of methanol can still diffuse through and accumulate in the sulfuric acid electrolyte 19, thereby exceeding the tolerance level. To prevent these amounts of methanol from reaching the oxidant electrode 17, a barrier 21 in the form of a porous layer of platinum black is directly attached to the separator 13 or placed on a suitable supporting grid between the separator 13 and oxidant electrode 17 but avoiding direct contact with the oxidant electrode as indicated at 21'.

The barrier 21 converts the methanol fuel by catalytic reaction into a specie which is no longer dangerous to operation of the oxidant electrode 17 or which can be prevented from further travelling to the oxidant electrode 17. The porous layer barrier 21 is chemically inert and does not change, as, for example, a porous layer of platinum black attached to the separator, or another support, may suit the purpose. Methanol contacting this dehydrogenation catalyst become dehydrogenated and finally decomposes to hydrogen and carbon dioxide which, due to the gaseous state, can be removed from the area of the oxidant electrode 17. In case the chemical reaction cannot be led to the desired end products by one catalyst, layers of several catalysts can be employed. For example, radio-isotopes effecting decomposition of the substrate or enducing reactions otherwise not possible, can be incorporated in these layers. Local heating provided from outside could also increase reaction rates.

Referring to FIG. 2, a porous fuel electrode 11 is spaced from a first separator 13 in a solution 15 of a fuel as for example, methanol in sulfuric acid electrolyte. A second separator 13' is spaced from an oxidant electrode 17 in a sulfuric acid electrolyte 19. To prevent diffusion of methanol from solution 15 to electrolyte 19, a barrier 23 in the form of a suitable catalyst suspended, solubilized, emulsified, or colloidally dispersed in sulfuric acid electrolyte is placed between separator 13 and separator 13'. This system has the advantage of easily replacing consumed active material.

Referring to FIG. 3, where like numerals refer to like parts, a porous fuel electrode 11 is spaced from a separator 13 in a solution 15 (not shown) of a fuel as for example, methanol in sulfuric acid. A porous oxidant electrode 17 is spaced from separator 13 by sulfuric acid electrolyte 19 (not shown). As described above, in order to remove the last traces of methanol fuel diffusion from solution 15 to oxidant electrode 17, a barrier 21 in the form of a porous layer, grid, or film composed of or containing a catalytic material is placed between the separator 13 and porous oxidant electrode 17. The barrier 21 is connected to the porous fuel electrode 11 as indicated. Strong fuel consumption takes place during cell operation at the porous fuel electrode 11, and the small remainder of fuel concentration building up in the sulfuric acid electrolyte 19 by the diffusion of fuel across the separator 13 immediately becomes consumed by anodic oxidation at the barrier 21 which now may be considered as an auxiliary electrode. The concentration difference created by the separator 13 will determine the operating potential at the porous fuel electrode 11 and the auxiliary electrode 21. If the change in concentration does not involve any change in polarization as is the case in FIG. 3, then porous fuel electrode 11 and auxiliary electrode 21 can be combined in parallel and a load can be connected between the porous oxidant electrode 17 and the parallel connected electrode 11 and barrier 21.

FIGS. 4 and 5 illustrate useful electrical connections for auxiliary load circuits that can be utilized between the barrier auxiliary electrode 21 and either the porous fuel electrode 11 or the porous oxidant electrode 17 when the difference in concentration between the porous fuel electrode and the auxiliary electrode created by the separator involves a change in polarization at the auxiliary electrode; that is, a change to a higher polarization. The circuit shown in FIG. 4 will be chosen if a higher voltage is desired in the auxiliary circuit, whereas the circuit shown in FIG. 5 will be chosen if a lower voltage is desired in the auxiliary circuit.

The foregoing description is to be considered illustrative only and not in limitation of the invention as hereinafter claimed.

What is claimed is:

1. A fuel cell for the direct production of electrical energy from an electrolyte soluble liquid fuel and a gaseous oxidant, said fuel cell comprising a porous fuel electrode, a porous oxidant electrode, a pair of spaced ion exchange membrane electrolyte separators positioned between and spaced from said porous fuel electrode and said porous oxidant electrode, and a diffusion barrier between said spaced separators wherein said diffusion barrier consists of a dispersion in an electrolytic liquid of catalysts capable of converting fuel and oxidant by catalytic reaction into species which are no longer dangerous to the operation of said oxidant electrode and said fuel electrode and thereby prevent the diffusion of fuel and oxidant to the counter electrode.

2. A fuel cell for the direct production of electrical energy from an electrolyte soluble liquid fuel and a gaseous oxidant, said fuel cell comprising a porous fuel electrode, a porous oxidant electrode, a pair of spaced separators positioned between and spaced from said porous fuel electrode and said porous oxidant electrode, and a diffusion barrier between said spaced separators wherein said diffusion barrier consists of a dispersion in an electrolytic liquid of catalysts capable of converting fuel by catalytic reaction into a species which is no longer dangerout to the operation of said oxidant electrode and thereby prevent the diffusion of fuel to the porous oxidant electrode.

3. A fuel cell for the direct production of electrical energy from an electrolyte soluble liquid fuel and a gaseous oxidant, said fuel cell comprising a porous fuel electrode, a porous oxidant electrode, a pair of spaced separators positioned between and spaced from said porous fuel electrode and said porous oxidant electrode, and a diffusion barrier between said spaced separators wherein said diffusion barrier consists of a dispersion in an electrolytic liquid of catalysts capable of converting said oxidant by catalytic reaction into a species which is no longer dangerous to the operation of said fuel electrode and thereby prevent the diffusion of oxidant to the porous fuel electrode.

References Cited

UNITED STATES PATENTS

| | | | |
|---|---|---|---|
| 2,104,973 | 1/1938 | Dassler | 136—3 X |
| 3,196,048 | 7/1965 | Shropshire et al. | 136—86 |
| 3,223,556 | 12/1965 | Cohn et al. | 136—86 |

ALLEN B. CURTIS, *Primary Examiner.*

WINSTON A. DOUGLAS, *Examiner.*

B. J. OHLENDORF, H. FEELEY, *Assistant Examiners.*